United States Patent
Swasey et al.

(10) Patent No.: US 9,528,466 B2
(45) Date of Patent: Dec. 27, 2016

(54) CYLINDER HEAD GASKET

(71) Applicant: Federal-Mogul Corporation, Southfield, MI (US)

(72) Inventors: Thomas W. Swasey, Okemos, MI (US); Chris Magewick, Livonia, MI (US); Bhawani Tripathy, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 120 days.

(21) Appl. No.: 14/633,946

(22) Filed: Feb. 27, 2015

(65) Prior Publication Data
US 2016/0252046 A1 Sep. 1, 2016

(51) Int. Cl.
*F02F 11/00* (2006.01)
*F16J 15/08* (2006.01)

(52) U.S. Cl.
CPC ........... *F02F 11/002* (2013.01); *F16J 15/0818* (2013.01); *F16J 2015/085* (2013.01); *F16J 2015/0862* (2013.01); *F16J 2015/0875* (2013.01)

(58) Field of Classification Search
CPC ................... F16J 2015/085; F16J 2015/0862; F16J 2015/0875; F16J 15/0818; F16J 15/0825; F02F 11/002
See application file for complete search history.

(56) References Cited

U.S. PATENT DOCUMENTS

| | | | |
|---|---|---|---|
| 1,779,616 A * | 10/1930 | Oven | F16J 15/123 277/601 |
| 3,473,813 A * | 10/1969 | Bailey | F16J 15/123 277/601 |
| 3,519,278 A | 7/1970 | Fuhrmann et al. | |
| 3,575,428 A | 4/1971 | Fuhrmann et al. | |
| 4,261,584 A | 4/1981 | Browne et al. | |
| 4,480,844 A * | 11/1984 | Kozerski | F16J 15/123 277/591 |
| 4,915,397 A | 4/1990 | Nicholson | |

(Continued)

FOREIGN PATENT DOCUMENTS

| | | |
|---|---|---|
| DE | 102007026478 B3 | 9/2008 |
| DE | 102007026476 A1 | 12/2008 |

(Continued)

*Primary Examiner* — Kristina Fulton
*Assistant Examiner* — Nicholas L Foster
(74) *Attorney, Agent, or Firm* — Robert L. Stearns; Dickinson Wright, PLLC

(57) ABSTRACT

The cylinder head gasket includes a gasket layer which presents an inner periphery that surrounds an opening. The gasket layer has a first thickness adjacent the inner periphery. A combustion seal is positioned in the opening and extends circumferentially around an axis. The combustion seal is joined with the inner periphery of the gasket layer. The combustion seal has a height that is greater than the first thickness of the gasket layer. The combustion seal includes at least one seal body which is generally C-shaped as viewed in cross-section and is resiliently flexible for maintaining fluid tight seals with the cylinder head and the engine block. The C-shaped seal body presents a pocket which faces away from the inner periphery of the of the gasket layer for receiving combustion gasses during use to improve the fluid tight seals established with the cylinder head and the engine block.

10 Claims, 3 Drawing Sheets

(56) References Cited

U.S. PATENT DOCUMENTS

| | | | |
|---|---|---|---|
| 5,340,126 A * | 8/1994 | Antonini | F16J 15/123 |
| | | | 277/601 |
| 5,354,072 A | 10/1994 | Nicholson | |
| 5,517,958 A | 5/1996 | Iikura | |
| 5,700,017 A | 12/1997 | Tensor | |
| 5,803,462 A * | 9/1998 | Kozerski | F16J 15/0825 |
| | | | 277/595 |
| 6,131,915 A * | 10/2000 | Nicholson | F16J 15/0825 |
| | | | 277/593 |
| 6,422,572 B1 * | 7/2002 | Ueda | F16J 15/0825 |
| | | | 277/591 |
| 6,502,833 B1 | 1/2003 | Shibata et al. | |
| 6,682,079 B2 | 1/2004 | Reisel et al. | |
| 6,739,595 B1 * | 5/2004 | Antonini | F02F 11/002 |
| | | | 277/591 |
| 6,758,479 B2 | 7/2004 | Miyaoh | |
| 7,100,925 B2 | 9/2006 | Swensen et al. | |
| 7,735,835 B2 | 6/2010 | Kullen et al. | |
| 7,866,040 B2 | 1/2011 | Swensen et al. | |
| 8,117,835 B2 | 2/2012 | Mori | |
| 2008/0164659 A1 * | 7/2008 | Kinoshita | F16J 15/0825 |
| | | | 277/595 |
| 2009/0072495 A1 * | 3/2009 | Kullen | F16J 15/0887 |
| | | | 277/630 |
| 2011/0109049 A1 | 5/2011 | Prehn et al. | |
| 2012/0056386 A1 | 3/2012 | Schmitt | |

FOREIGN PATENT DOCUMENTS

| | | |
|---|---|---|
| DE | 102009022393 A1 | 12/2010 |
| EP | 2288832 A1 | 3/2011 |
| JP | 2186164 A | 7/1990 |
| WO | 2010133213 A1 | 11/2010 |
| WO | 2010136016 A1 | 12/2010 |

* cited by examiner

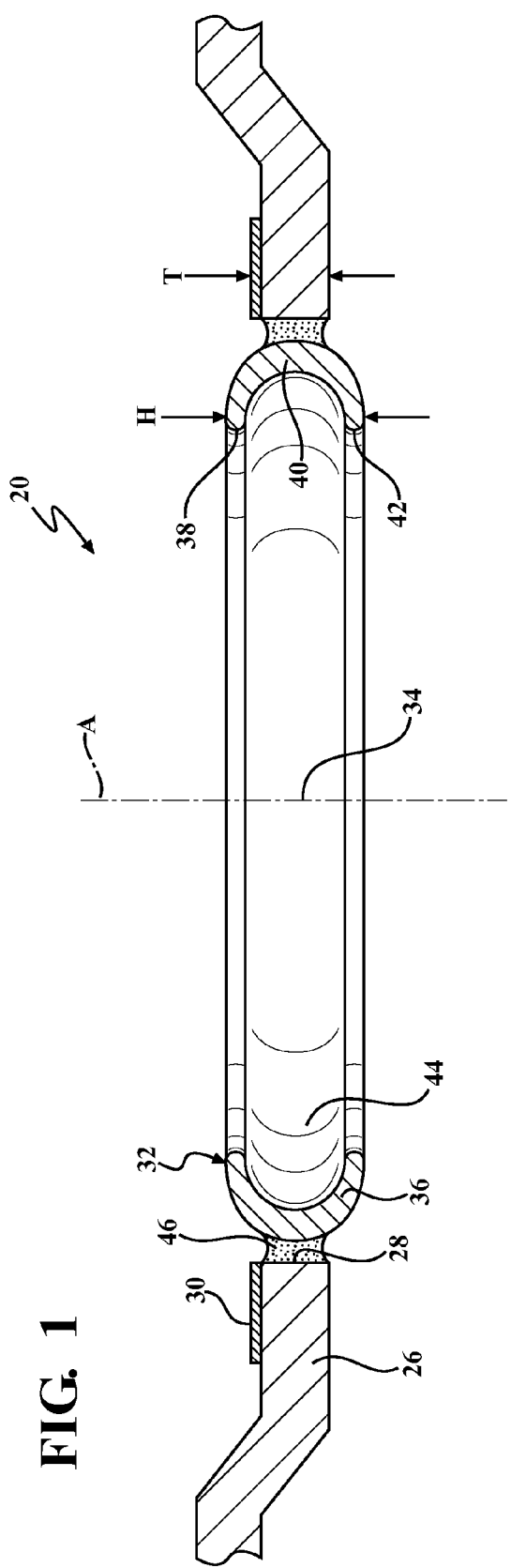
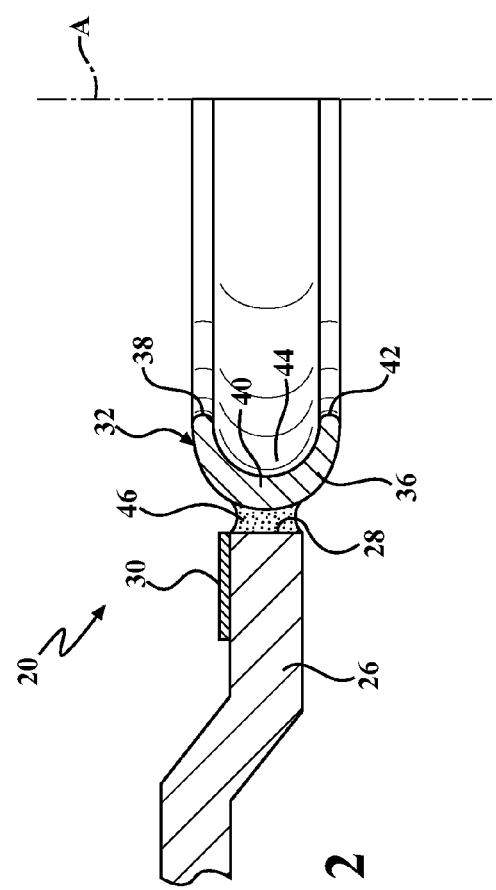
FIG. 1
FIG. 2

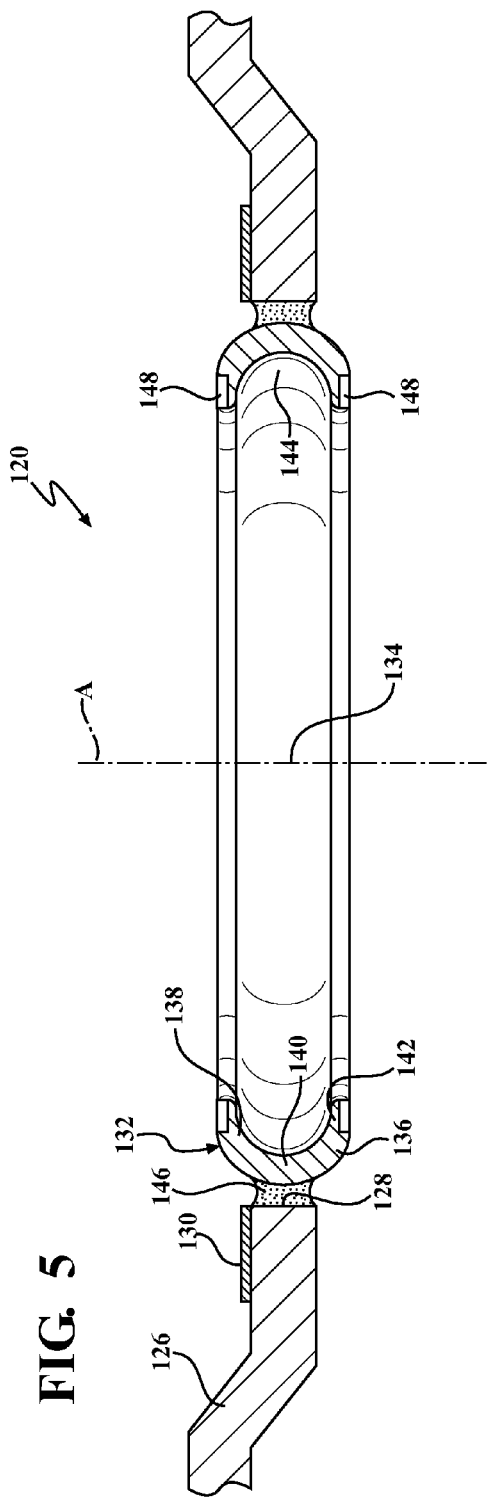
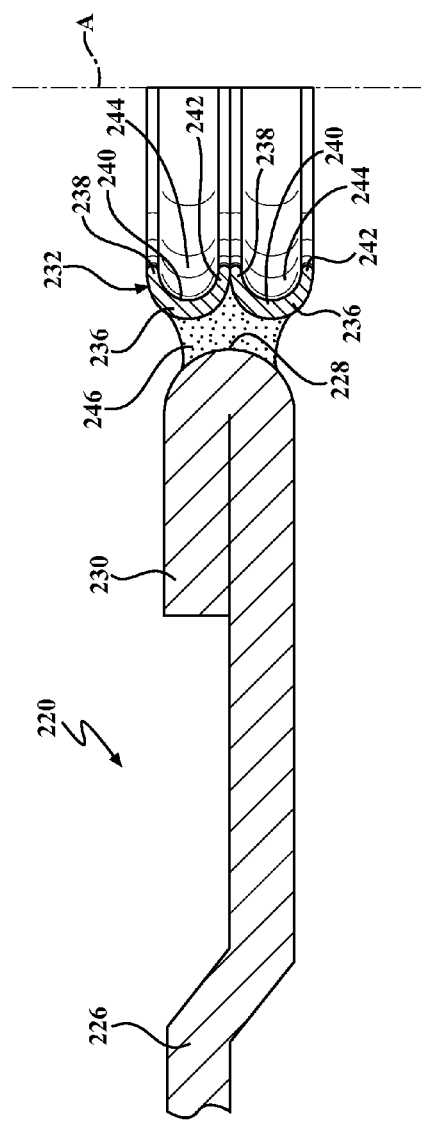

CYLINDER HEAD GASKET

BACKGROUND OF THE INVENTION

1. Field of the Invention

The present invention is directed to cylinder head gaskets for establishing a fluid-tight seal between an engine block and a cylinder head of a piston driven internal combustion engine.

2. Related Art

In a continuing effort to improve fuel economy while improving or at least maintaining power output, engine manufacturers have increasingly been employing advanced technologies, such as direct injection, turbochargers and superchargers. One common effect of these advanced technologies is increased combustion pressures and temperatures. During operation of the engine, this may result in increased movement of the cylinder head relative to the engine block as the combustion of a fuel and air mixture within a plurality of cylinder bores tends to energize the cylinder head away from the engine block. It is important for the cylinder head gasket to maintain a fluid tight seal during the lifting movement of the cylinder head away from the engine block in order to trap the combustion gasses in the combustion bore.

Some cylinder head gaskets include multiple layers, at least one of which has an embossed bead formed therein for resiliently flexing to maintain the fluid-tight seals with the engine block and cylinder head.

SUMMARY OF THE INVENTION AND ADVANTAGES

One aspect of the present invention is related to an improved cylinder head gasket for establishing a fluid tight seal between a cylinder head and an engine block of an internal combustion engine. The cylinder head gasket includes a gasket layer which presents at least one inner periphery that surrounds at least one opening. The gasket layer has a first thickness adjacent the inner periphery. A combustion seal is positioned in the opening and extends circumferentially around an axis between ends that are joined together. The combustion seal is joined with the inner periphery of the gasket layer. The combustion seal has a height in a direction parallel to the axis, and the height is greater than the first thickness of the gasket layer. The combustion seal includes at least one seal body which is generally C-shaped as viewed in cross-section and is resiliently flexible for maintaining fluid tight seals with the cylinder head and the engine block during operation of the engine. The C-shaped seal body presents a pocket which faces away from the inner periphery of the of the gasket layer for receiving combustion gasses during use to improve the fluid tight seals established with the cylinder head and the engine block.

According to another aspect of the present invention, the C-shaped seal body has a top portion, a middle portion and a bottom portion, and the top and bottom portions each present flats on which a high temperature coating is disposed.

According to yet another aspect of the present invention, the combustion seal includes a pair of the C-shaped seal bodies which are stacked axially on top of one another.

Another aspect of the present invention provides for a method of making a cylinder head gasket for establishing a fluid tight seal between an engine block and a cylinder head. The method includes the step of preparing a gasket layer with at least one inner periphery that surrounds an opening. The method continues with the step of bending a length of a strip of metal into a C-shape with a pocket as viewed in cross-section. The method proceeds with the step of bending the C-shaped strip of metal around an axis into a ring and with the pocket facing radially inwardly towards the axis. The method continues with the step of joining opposite ends of the C-shaped ring together. The method proceeds with the step of joining an outer diameter of the C-shaped ring with the inner periphery of the gasket layer.

According to another aspect of the present invention, the C-shaped ring has a top portion, a middle portion and a bottom portion, and the method continues with the steps of machining flats in the top and bottom portion and disposing a high temperature coating on the flats.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 1 is a cross-sectional view of a first exemplary embodiment of a cylinder head gasket;

FIG. 2 is another cross-sectional and fragmentary view of the first exemplary embodiment of the cylinder head gasket;

FIG. 5 is a cross-sectional view of a second exemplary embodiment of the cylinder head gasket; and FIG. 6 is a cross-sectional view of a third exemplary embodiment of the cylinder head gasket.

DETAILED DESCRIPTION OF THE ENABLING EMBODIMENTS

Figure 3:
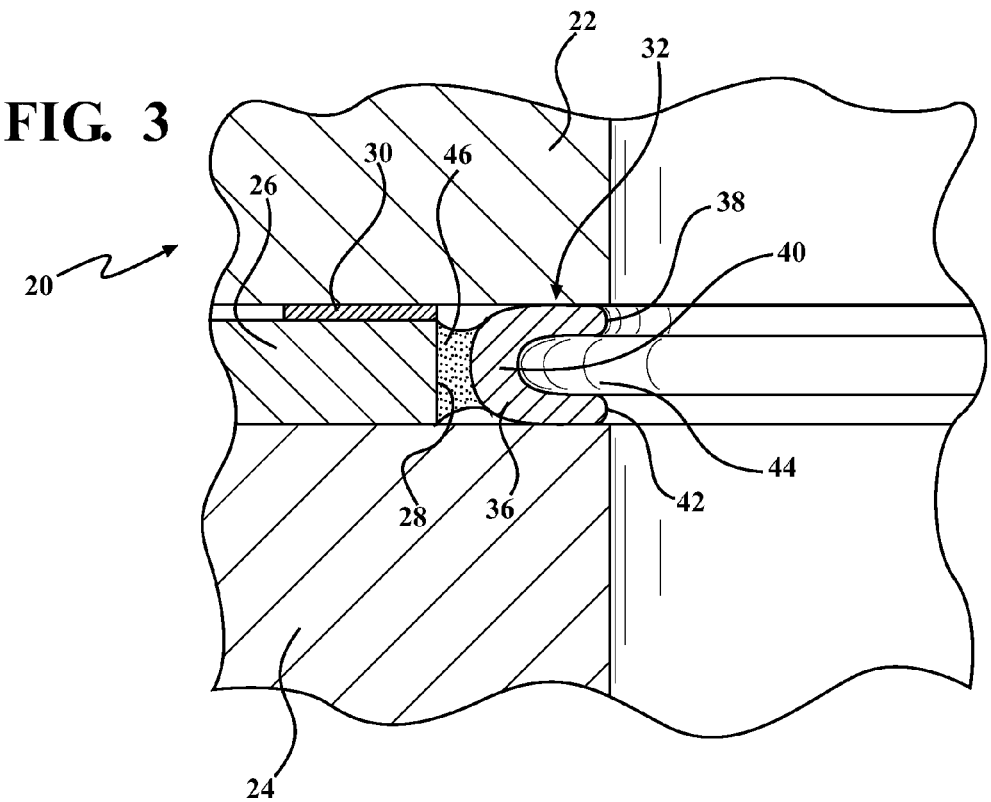
FIG. 3 is a cross-sectional and fragmentary view of the first exemplary embodiment of the cylinder head gasket and sandwiched between a cylinder head and an engine block of an internal combustion engine.
Figure 4:
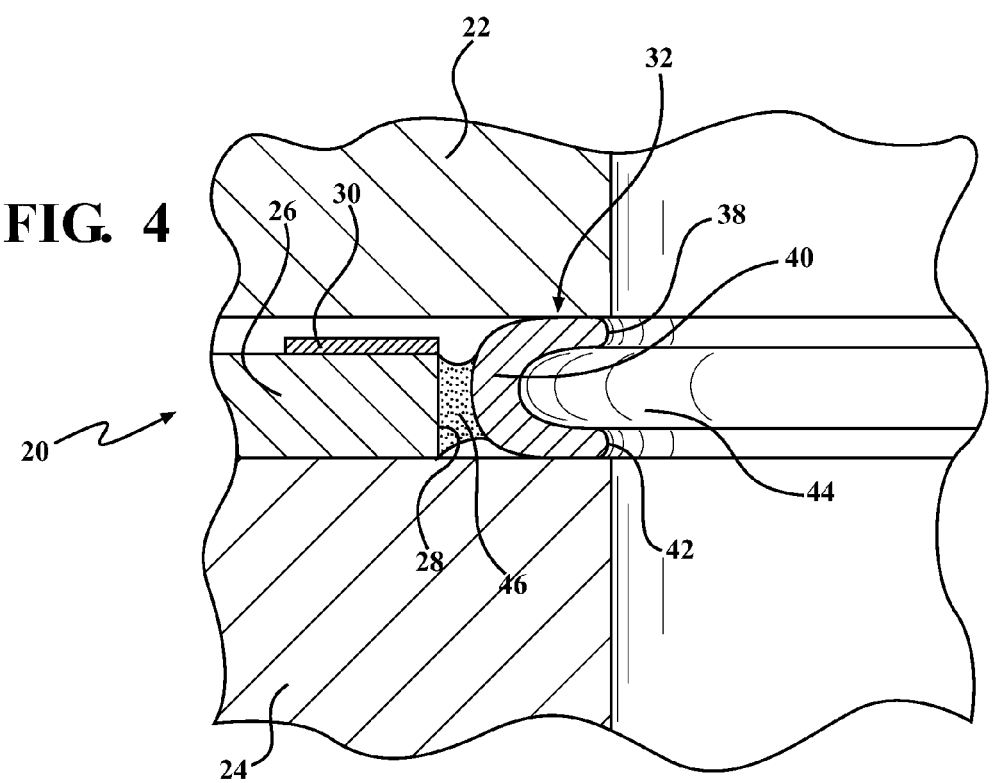
FIG. 4 is cross-sectional and fragmentary view of the first exemplary embodiment of the cylinder head gasket and sandwiched between a cylinder head and an engine block of an internal combustion engine with the cylinder head being lifted away from the engine block during a power stroke of a piston (not shown)

Referring to the Figures, wherein like numerals indicate corresponding parts throughout the several views, a first exemplary embodiment of a cylinder head gasket 20 is generally shown in FIGS. 1-4. As shown in FIGS. 3 and 4, the cylinder head gasket 20 is configured for providing a fluid tight seal between a cylinder head 22 and an engine block 24 of an internal combustion engine to seal combustion and exhaust gasses in one or more cylinder bores during operation of the engine. For the purposes of simplicity, the term "engine block" as used herein also includes one or more cylinder liners (also known as sleeves) for engines that include cylinder liners. The cylinder head gasket 20 may find uses in a range of different types of piston driven internal combustion engines including, for example, two or four stroke engines and gasoline or diesel fueled engines.

Referring to FIG. 1, the exemplary cylinder head gasket 20 includes a single gasket layer 26 with a plurality of inner peripheries 28 (only one being shown) that surround a plurality of openings that correspond with the cylinder bores of the engine. The gasket layer 26 may be a functional layer or a distance layer and is preferably formed of metal. In this exemplary embodiment, the gasket layer 26 has a stopper 30 which is located adjacent the inner periphery 28. As shown, the gasket layer 26 has a first thickness T at or adjacent the inner periphery 28. If a stopper 30 is employed, as is the case with the first exemplary embodiment, then the first thickness T is the combination of the thicknesses of both the gasket layer 26 adjacent the inner periphery 28 and the stopper 30.

The cylinder head gasket 20 further includes a plurality of combustion seals 32 (only one of which is shown) which are positioned in the openings and are joined with the inner peripheries 28 of the gasket layer 26. The combustion seal 32 extends circumferentially around an axis A between opposite ends which are joined together at a weld seam 34. The combustion seal 32 has a seal body 36 which has a generally C-shaped cross-section which extends through an arc from a top portion 38, through a middle portion 40 and to a bottom portion 42. The C-shaped seal body 36 has a height H which extends in an axial direction from a top of the top portion 38 to a bottom of the bottom portion 42. As shown in FIG. 1, the height H of the C-shaped seal body 36 is greater than the first thickness T of the gasket layer 26 and stopper 30 for sealing against the cylinder head 22 and the engine block 24 (see FIGS. 3 and 4) when installed in the engine.

In this exemplary embodiment, the C-shaped seal body 36 has a variable thickness as viewed in cross-section from the top portion 38, through the middle portion 40 and to the bottom portion 42. Specifically, the middle portion 40 has a greater thickness than the top and bottom portions 38, 42. However, depending on the specific performance that is desired, the C-shaped seal body 36 could alternately be provided with a generally uniform thickness.

As viewed in cross-section, the C-shaped seal body 36 presents a pocket 44 which faces radially inwardly towards the axis. As shown in FIGS. 3 and 4, when installed in the engine, the pocket 44 faces towards the cylinder bore. The C-shaped seal body 36 is of a resiliently flexible material for flexing during operation of the engine to maintain the fluid tight seals with the cylinder head 22 and the engine block 24. Specifically, the C-shaped seal body 36 of the combustion seal 32 is configured to maintain the fluid tight seals around the combustion bores including during power strokes of pistons within the combustion bores when the cylinder head 22 may have a tendency to "lift off" of the engine block 24. For example, FIG. 3 shows the positioning of the cylinder head 22 during the power stroke with the cylinder head 22 being lifted off of the stopper 30, and FIG. 4 shows the positioning of the cylinder head 22 during one of the other strokes of a four-stroke combustion cycle with the cylinder head 22 abutting the stopper 30.

Additionally, the orientation of the C-shaped seal body 36 with the pocket 44 facing into the cylinder bore is advantageous because it allows for improved sealing during the power stroke, which is when sealing is most difficult. Specifically, during operation of the engine, the super-pressurized combustion gasses in the cylinder bore from the combustion of a fuel and air mixture enters the pocket 44. The pressurized combustion gasses in the pocket 44 have the effect of urging the top portion 38 of the C-shaped seal body 36 upwardly against the cylinder head 22 and energizes the bottom portion 42 downwardly against the engine block 24. As such, the exemplary cylinder head gasket 20 exhibits improved performance as compared to other known cylinder head gaskets because it maintains a more robust fluid tight seal throughout the entire combustion cycle within the cylinder bore.

The C-shaped seal body 36 of the combustion seal 32 is connected with the inner periphery 28 of the gasket layer 26 at the outer diameter of the middle portion 40. In the exemplary embodiment, the combustion seal 32 is connected with the gasket layer 26 via a compliant polymer 46. Alternately, the combustion seal 32 could be joined with the gasket layer 26 via, for example, welding, an armor ring, or swaging. The gap or distance between the outer diameter of the middle portion 40 of the C-shaped seal body 36 and the inner periphery 28 of the gasket layer 26 can be specifically chosen to provide the C-shaped seal body 36 with desirable stiffness characteristics during operation of the engine. Specifically, direct contact between the C-shaped seal body 36 and the inner periphery 28 will provide for a relatively stiffer C-shaped seal body 36 whereas a gap between the C-shaped seal body 36 and the inner periphery 28 will provide for a relatively more flexible C-shaped seal body 36. Fatigue may also be optimized by engineering an optimum distance between the C-shaped seal body 36 and the inner periphery 28 of the gasket layer 26.

The C-shaped seal body 36 is preferably made of one integral piece of a metal with high elasticity and high temperature resistivity, such as a high temperature steel alloy. The C-shaped seal body 36 may be formed, for example, from a wire or a strip of metal. Alternately, the C-shaped seal body 36 may be formed by cutting a predetermined length of tubing and bending or otherwise shaping the length of tubing into the predetermined shape.

Referring now to FIG. 5, a second exemplary embodiment of the cylinder head gasket 120 is generally shown with like numerals, separated by a factor of 100, indicating corresponding parts with the first exemplary embodiment described above. The second embodiment of the cylinder head gasket 120 is distinguished from the first embodiment by including flats formed into a top surface of the top portion 138 and a bottom surface of the bottom portion 142 of the C-shaped seal body 136. A high temperature coating 148 is disposed on the flats. As such, the high temperature coating directly contacts the cylinder head and the engine block (not shown in this Figure). The high temperature coating 148 may further improve the seals established with the cylinder head and the engine block. The flats are preferably disposed at a predetermined angle so that a greater contact pressure is transferred through the high temperature coating 148 from the C-shaped seal body 136 on an inner side of the flat than an outer side of the flat.

Referring now to FIG. 6, a third exemplary embodiment of the cylinder head gasket 220 is generally shown with like numerals, separated by a factor of 200, indicating corresponding parts throughout the several views. In the second exemplary embodiment, the gasket layer 226 is folded over itself to present the stopper 230. In contrast to the first exemplary embodiment described above, the combustion seal 232 includes two (rather than one) C-shaped seal bodies which are stacked axially on top of one another. In operation, pressurized gasses in the pockets 244 of the C-shaped seal bodies improves the fluid tight seals between the combustion seal 232 and the cylinder head and engine block (not shown in this Figure).

Referring back to the second exemplary embodiment of the cylinder head gasket 120 shown in FIG. 5, another aspect of the present invention is a method of making a cylinder head gasket 120. The method includes the step of preparing a gasket layer 126 which includes at least one inner periphery 128 that surrounds an opening. The method proceeds with the step of bending a length of a strip of metal into a C-shape with a pocket 144 as viewed in cross-section. The metal strip may be bent into the C-shape as one long, continuous strip and then cut to length thereafter or it may first be first cut to length and then bent into the C-shape.

The method proceeds with the step of bending the C-shaped strip of metal around an axis into a ring and with the pocket 144 facing radially inwardly towards the axis. The method continues with the step of joining opposite ends of the C-shaped ring together. Preferably, the opposite ends of the C-shaped ring are joined together via welding. The method proceeds with the step of joining an outer diameter of the C-shaped ring with the inner periphery 128 of the gasket layer 126. The C-shaped ring is preferably joined with the gasket layer 126 via at least one of a compliant polymer, welding, an armor ring, and swaging.

After being bent into shape, the C-shaped ring has a top portion 138, a middle portion 140 and a bottom portion 142. The method may further include the step of machining a first flat into the top portion 138 and a second flat into the bottom portion 142 and disposing a high temperature coating 148 on the first and second flat.

Obviously, many modifications and variations of the present invention are possible in light of the above teachings and may be practiced otherwise than as specifically described while within the scope of the appended claims.

What is claimed is:

1. A cylinder head gasket establishing a fluid tight seal between a cylinder head and an engine block of an internal combustion engine, comprising:
    a gasket layer which presents at least one inner periphery that surrounds at least one opening and said gasket layer having a first thickness adjacent said inner periphery;
    a combustion seal positioned in said at least one opening and extending circumferentially around an axis between ends that are joined together and said combustion seal being joined with said inner periphery if said gasket layer;
    said combustion seal having a height in a direction parallel to said axis and said height being greater than said first thickness of said gasket layer;
    said combustion seal which is substantially generally C-shaped in cross-section and is resiliently flexible for maintaining fluid tight seals with the cylinder head and the engine block during operation of the engine;
    wherein after full compression said C-shaped combustion seal presents a pocket which faces away from said inner periphery of said at least one gasket layer for receiving combustion gasses during use to improve the fluid tight seals established with the cylinder head and the engine block, and
    wherein the combustion seal is separate and completely spaced from the gasket layer.

2. The cylinder head gasket as set forth in claim 1 wherein said gasket layer is a functional layer or a distance layer.

3. The cylinder head gasket as set forth in claim 1 wherein said combustion seal extends arcuately from a top portion, through a middle portion, and to a bottom portion.

4. The cylinder head gasket as set forth in claim 3 wherein at least one of said top and bottom portions presents a flat and wherein a high temperature coating is disposed on said flat.

5. The cylinder head gasket as set forth in claim 4 wherein both of said top and bottom portions presents a flat and wherein said high temperature coating is disposed on each of said flats.

6. The cylinder head gasket as set forth in claim 1 wherein said combustion seal includes two of said seal bodies stacked axially.

7. The cylinder head gasket as set forth in claim 1 wherein said ends of said combustion seal are joined together at a weld joint.

8. The cylinder head gasket as set forth in claim 1 wherein said combustion seal is spaced from said gasket layer by at least one of a compliant polymer, and a weld joint.

9. The cylinder head gasket as set forth in claim 1 wherein as viewed in cross-section said combustion seal has a variable thickness through said top, middle and bottom portions.

10. The cylinder head gasket as set forth in claim 9 wherein said middle portion has a greater thickness than said top and bottom portions.

* * * * *